US012379091B2

(12) United States Patent
Zheng

(10) Patent No.: US 12,379,091 B2
(45) Date of Patent: Aug. 5, 2025

(54) FOLDABLE LAMPSHADE

(71) Applicant: JOININ GLOBAL PTE.LTD., Singapore (SG)

(72) Inventor: Hongbing Zheng, Hangzhou (CN)

(73) Assignee: JOININ GLOBAL PTE.LTD. (SG)

( * ) Notice: Subject to any disclaimer, the term of this patent is extended or adjusted under 35 U.S.C. 154(b) by 0 days.

(21) Appl. No.: 18/444,737

(22) Filed: Feb. 18, 2024

(65) Prior Publication Data

US 2024/0401768 A1 Dec. 5, 2024

(30) Foreign Application Priority Data

Jun. 5, 2023 (CN) .......................... 2023214105624

(51) Int. Cl.

| | |
|---|---|
| ***F21V 1/06*** | (2006.01) |
| ***F21V 1/14*** | (2006.01) |
| ***F21V 17/00*** | (2006.01) |
| ***F21V 17/10*** | (2006.01) |

(52) U.S. Cl.

CPC ................ *F21V 1/06* (2013.01); *F21V 1/143* (2013.01); *F21V 17/007* (2013.01); *F21V 17/107* (2013.01)

(58) Field of Classification Search

CPC ................................. F21V 1/06; F21V 17/107

USPC .......................................................... 362/352

See application file for complete search history.

(56) References Cited

U.S. PATENT DOCUMENTS

| | | | | |
|---|---|---|---|---|
| 11,435,055 B1 * | 9/2022 | Shen | F21V 1/143 | |
| 12,018,813 B1 * | 6/2024 | Schaak | F21V 1/143 | |
| 2002/0118543 A1 * | 8/2002 | Wu | F21V 17/007 | 362/357 |
| 2004/0151000 A1 * | 8/2004 | Juang | F21V 1/06 | 362/358 |
| 2023/0408060 A1 * | 12/2023 | Xue | F21V 1/06 | |

* cited by examiner

*Primary Examiner* — William N Harris

(74) *Attorney, Agent, or Firm* — IPRTOP LLC

(57) ABSTRACT

A foldable lampshade is provided, which includes a foldable support frame and a cloth covering, where the cloth covering is detachably connected to the foldable support frame, and the foldable support frame includes an outer support frame, an inner support member, and connecting members connecting the outer support frame and the inner support member. The outer support frame includes a first support member, a second support member, and first joint members, where the first support member is foldably connected to the second support member through the first joint members, the inner support member has a hinge structure, and the rotational axis of the first joint members and the rotational axis of the hinge structure are located on a same axis line. The foldable lampshade adopts a foldable support frame, which has a simple structure, is easy to disassemble and install, and effectively saves the intermediate cost.

13 Claims, 8 Drawing Sheets

FOLDABLE LAMPSHADE

TECHNICAL FIELD

The present disclosure relates to the technical field of lampshades, and in particular, to a foldable lampshade.

BACKGROUND OF THE INVENTION

Lampshades, including table lampshades, floor lampshades, ceiling lampshades, etc, are typically used as accessories with lamps. Lampshades are usually set in the periphery of the light source to concentrate light or prevent wind and rain. They can achieve different light effects when different light sources are used. In addition, the lampshades have a decorative effect and can soften the light, so as to create a warm and soothing atmosphere and increase the relaxation of the space, thus reducing the pressure from the space. However, the packages of most of the lampshades on the market are large, resulting in high transportation costs.

SUMMARY OF THE INVENTION

The present disclosure provides a foldable lampshade, which solves the problems of difficulty in assembly, difficulty in transportation due to excessive packaging volume, and high transportation costs.

In a first aspect, the present disclosure provides a foldable lampshade, and the foldable lampshade includes a foldable support frame and a cloth covering. The cloth covering is detachably connected to the foldable support frame, and the foldable support frame includes an outer support frame, an inner support member, and a plurality of connecting members connecting the outer support frame to the inner support member. The outer support frame includes a first support member, a second support member, and a plurality of first joint members, where the first support member and the second support member are foldably connected to each other by the first joint members. The inner support member has a hinge structure, and a rotational axis of the first joint members and a rotational axis of the hinge structure are located on the same axis line.

The foldable lampshade of the present disclosure adopts a foldable support frame, which can be folded into two identical support members by the setting of the hinge structure and the joint members. The foldable support frame can be applied to different lamps, and facilitates the packaging and transportation, which effectively saves the intermediate cost.

In one embodiment of the first aspect, the foldable lampshade further includes a foldable base frame detachably connected to the cloth covering; where the foldable base frame includes a support frame, and the support frame includes a third support member, a fourth support member, and a plurality of second joint members. The third support member and the fourth support member are foldably connected via the second joint members.

In one embodiment of the first aspect, the hinge structure includes two hinge pieces that match each other, and each end of each hinge piece is provided with a protruding rotating member and a groove. Each hinge piece has a first end with a protruding rotating member being located on an outer side of a groove, and a second end with a protruding rotating member being located on an inner side of groove.

In one embodiment of the first aspect, the first support member is symmetrical with the second support member along the axis line.

In one embodiment of the first aspect, the first support member is asymmetrical with the second support member along the axis line.

In one embodiment of the first aspect, the first support member is a first semi-circular member, and the second support member is a second semi-circular member. The first semi-circular member and the second semi-circular member are foldably connected by the first joint members to form a circular outer support frame.

In one embodiment of the first aspect, the inner support member is fixedly connected to the first support member and the second support member through at least two connecting members, respectively.

In one embodiment of the first aspect, the first support member and the second support member are provided with one or more first fixing holes for connecting the connecting members, respectively.

In one embodiment of the first aspect, the inner support member is provided with a plurality of second fixing holes for connecting the connecting members.

In one embodiment of the first aspect, the first support member and the corresponding connecting member are integrated into one-piece, and the second support member and the corresponding connecting member are integrated into one-piece.

In one embodiment of the first aspect, the third support member is symmetrical with the fourth support member along the rotational axis of the second joint members.

In one embodiment of the first aspect, the third support member is asymmetrical with the fourth support member along the rotational axis of the second joint members.

In one embodiment of the first aspect, the shape of the foldable support frame is selected from a group consisting of circular, rectangular, elliptical, fanshaped, and polygonal.

As described above, the foldable lampshade in the present disclosure has the following beneficial effects:

- the foldable lampshade in the present disclosure has a simple structure, and because of the foldable support frame, it is easy to disassemble and install the foldable lampshade, which does not require additional installation tools. The foldable support frame in the present disclosure can be folded into two identical support members by the setting of the hinge structure and the joint members, and it can be applied to different lamps. In addition, it is easy to pack and transport the foldable lampshade of the present disclosure, which effectively saves the intermediate cost.

BRIEF DESCRIPTION OF DRAWINGS

FIGS. 4*a*-4*f* show schematic diagrams of an inner support member according to an embodiment of the present disclosure.

Figure 1:
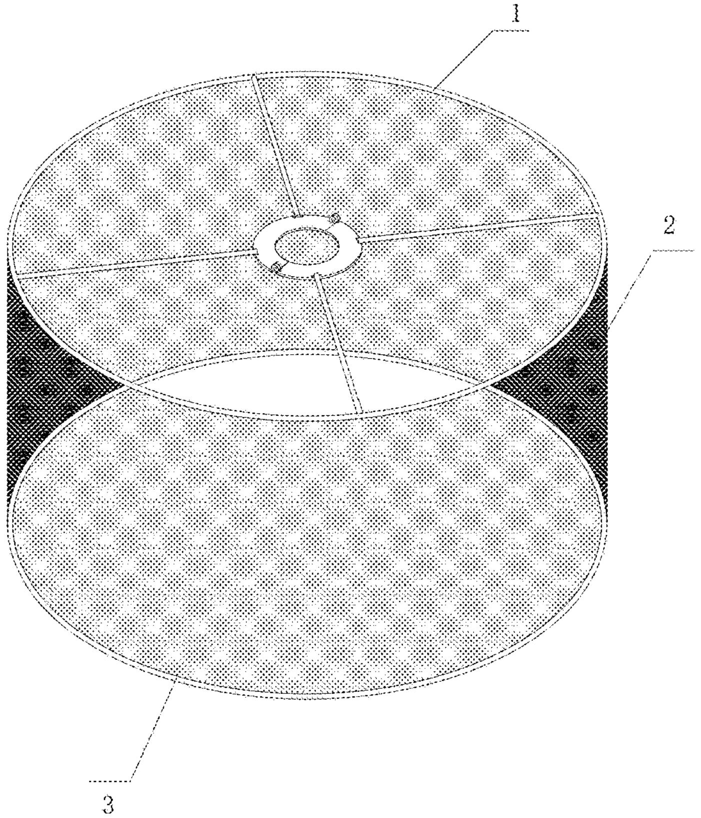
FIG. 1 shows a schematic structural diagram of a foldable lampshade according to an embodiment of the present disclosure.

| Reference Numerals | |
|---|---|
| 1 | Foldable support frame |
| 11 | Outer support frame |
| 111 | First support member |
| 112 | Second support member |
| 113 | Joint member |
| 113a | First joint member |
| 113b | Second joint member |
| 114, 1141-1144 | First fixing hole |
| 12 | Inner support member |
| 121 | First hinge piece |
| 122 | Second hinge piece |
| 1211a-1211b, 1221a-1221b | Rotating member |
| 1212a-1212b, 1222a-1222b | Groove |
| 123, 1231-1234 | Second fixing hole |
| 13 | Connecting member |
| 131 | First connecting member |
| 132 | Second connecting member |
| 133 | Third connecting member |
| 134 | Fourth connecting member |
| 2 | Cloth covering |
| 3 | Foldable base frame |
| 31 | Support Frame |
| 311 | Third support member |
| 312 | Fourth support member |
| 313 | Joint member |
| 313a | Third joint member |
| 313b | Fourth joint member |

DETAILED DESCRIPTION OF THE INVENTION

The following illustrates the embodiments of the present disclosure by particular specific examples, and other advantages and effects of the present disclosure can be easily understood by those skilled in the art from the contents disclosed in this specification. The present disclosure may be implemented or applied in different specific embodiments, and the details in this specification may be modified or changed based on different views and applications without departing from the spirit of the present disclosure. It should be noted that the following embodiments and the features in the embodiments may be combined without conflict.

It should also be noted that the drawings in the following embodiments only schematically illustrate the basic concept of the present disclosure, therefore, only the components related to the present disclosure are shown in the drawings, and these drawings are not drawn in accordance with the number, shapes, and sizes of the components in actual implementation. The types, numbers, and proportions of the components in actual implementation may be subject to arbitrary changes, and the layout of the components may also be more complex.

The following embodiment of the present disclosure provides a foldable lampshade, which is easy to assemble, convenient to transport due to reduced packaging volume, and cheap in transportation costs.

The principle and implementation of the foldable lampshade of this embodiment will be described in detail in the following with reference to the accompanying drawings, so that a person skilled in the art can understand the foldable lampshade of this embodiment without the need for creative thinking.

It should be noted that the fabric lampshade can be used for table lamps, floor lamps, ceiling lamps, etc. Due to different lamps having different shapes, such as round, oval, square, rectangular, and polygonal, the lampshades can also be designed in different shapes to adapt to the corresponding lamps. A circular lampshade is taken as an example for illustration in the present disclosure.

Figure 2:
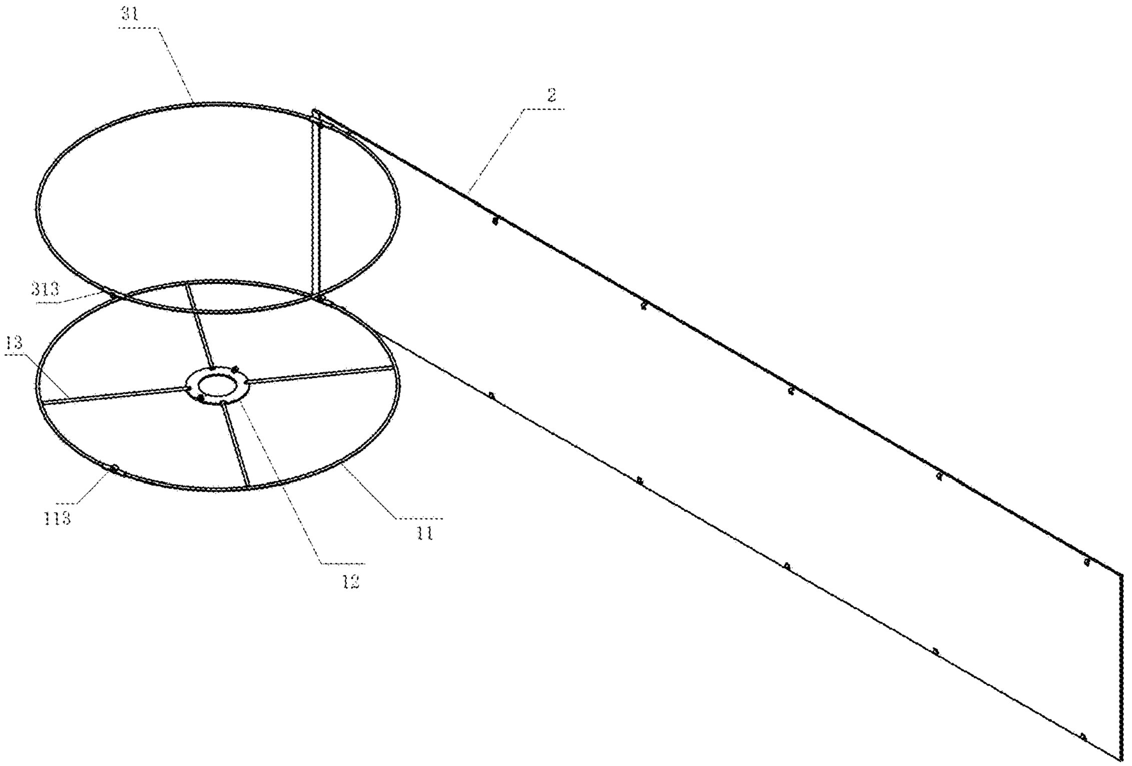
FIG. 2 shows a schematic diagram of the installation of the foldable lampshade according to an embodiment of the present disclosure.

As shown in FIGS. 1 and 2, this embodiment provides a foldable lampshade. The foldable lampshade includes a foldable support frame 1 and a cloth covering 2, where the cloth covering 2 is detachably connected to the foldable support frame 1. The foldable support frame includes an outer support frame 11, an inner support member 12, and multiple connecting members 13 connecting the outer support frame with the inner support member. The outer support frame includes a first support member 111, a second support member 112, and a joint member 113, where the first support member 111 and the second support member 112 are foldably connected by the joint member 113. The inner support member 12 has a hinge structure, and the rotational axis of the joint member 113 and the rotational axis of the hinge structure are located on the same axis line.

Specifically, for the setting of the cloth covering, the cloth covering can be detachably connected to the foldable support frame, so that different cloth coverings can be freely used to obtain lampshades with different effects, and the cloth covering can also be fixedly connected to the foldable support frame, so that re-installation is not needed, which saves time and cost when performing assembly.

Figure 3A:
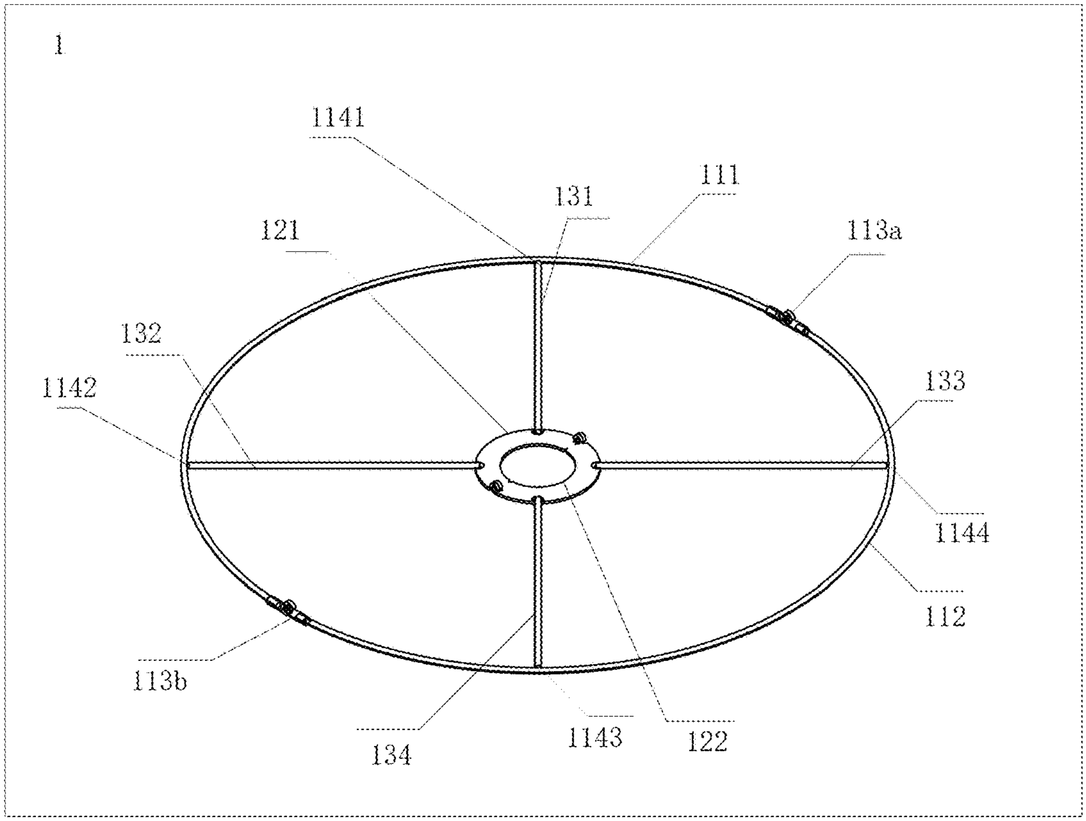
FIGS. 3*a*-3*c* show schematic structural diagrams of a foldable support frame according to an embodiment of the present disclosure.
Figure 3B:
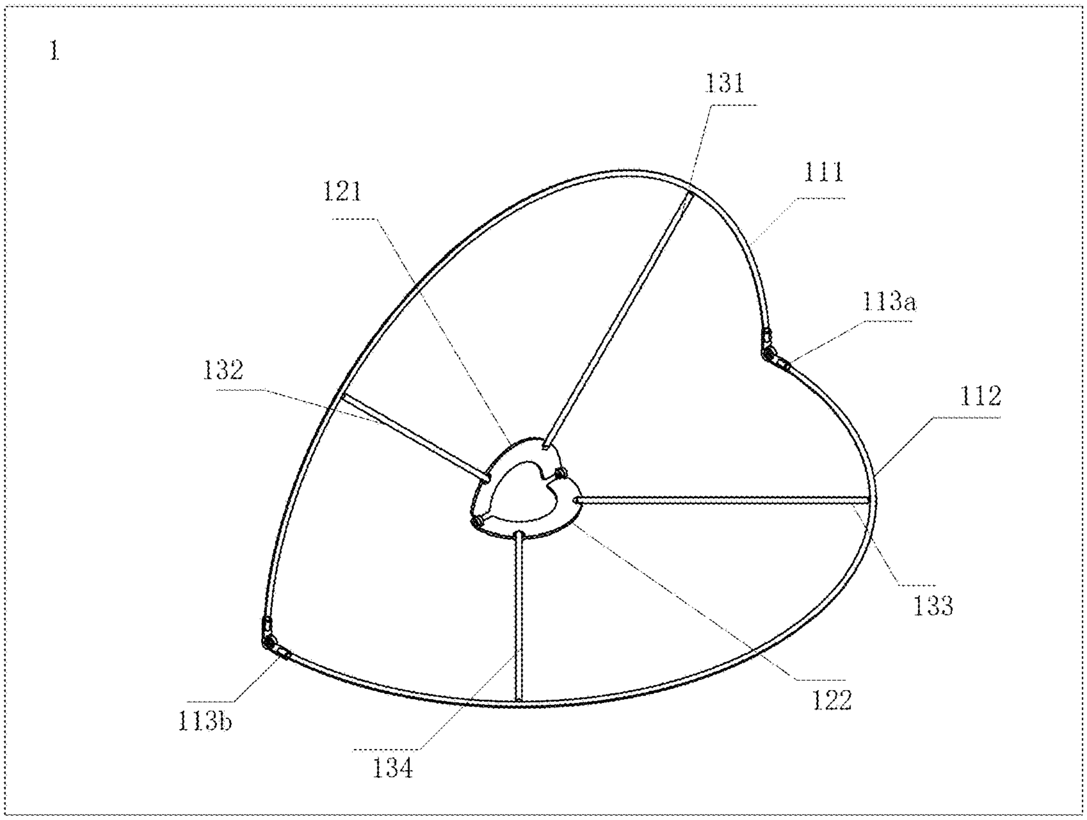
Figure 3C:
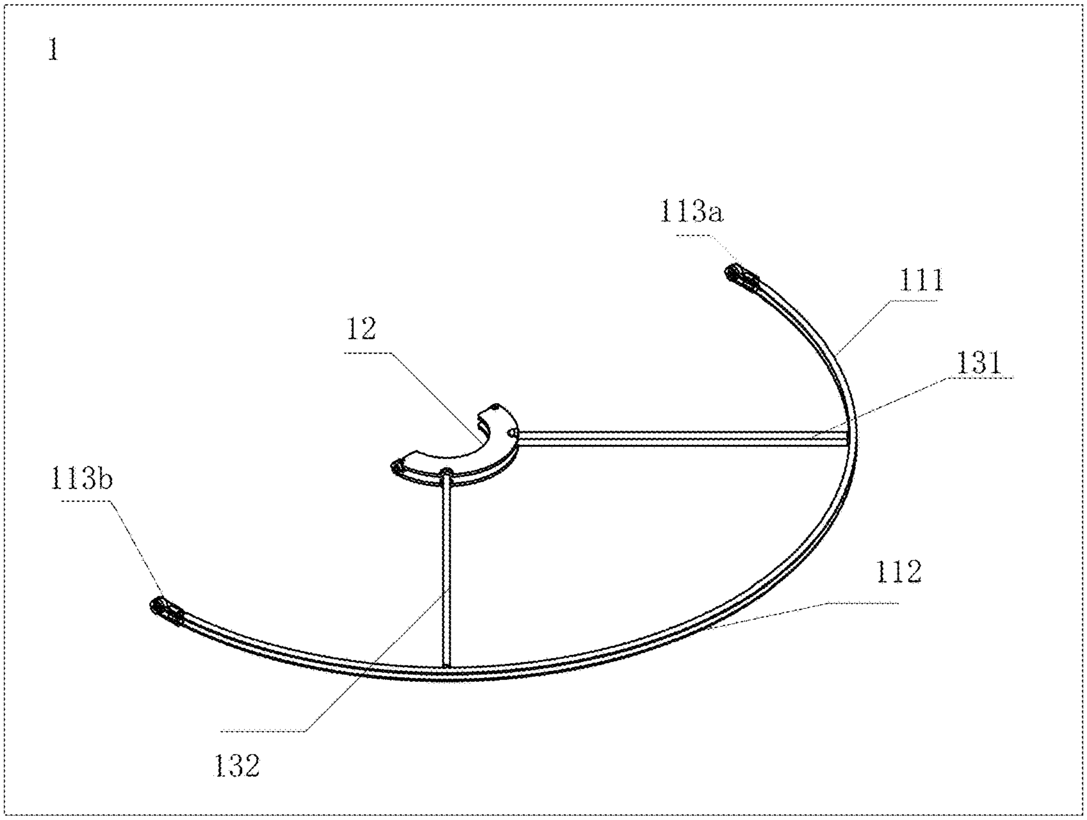

FIGS. 3*a*-3*c* show schematic structural diagrams of the foldable support frame according to the embodiment of the present disclosure. The foldable support frame includes the outer support frame 11, the inner support member 12, and multiple connecting members 13 connecting the outer support frame to the inner support member. The outer support frame includes the first support member 111, the second support member 112, and the joint member 113, where the first support member 111 and the second support member 112 are foldably connected by the joint member 113. The inner support member 12 has a hinge structure, and the rotating axis of the joint member 113 and the rotating axis of the hinge structure are located on the same axis line.

The joint member 113 includes a first joint member 113*a* and a second joint member 113*b*, and the ends of the first support member 111 and the second support member 112 are foldably connected by the first joint member 113*a* and the second joint member 113*b*, respectively.

It is to be noted that the first joint member 113*a* and the second joint member 113*b* have the same structure.

FIGS. 4*a*-4*f* show schematic structural diagrams of the inner support member according to the embodiment of the present disclosure. The inner support member 12 has a hinge structure. The rotating axis of the joint member 113 and the rotating axis of the hinge structure are located on the same axis line.

In an embodiment of the present disclosure, the hinge structure includes two hinge pieces that match each other. Each of two ends of each hinge piece is provided with a protruding rotating member and a groove. In an embodiment, the rotating member is an arc-shaped rotating member. In an embodiment, the rotating member is a notched ring that can be inserted with a rivet. At a first end of one hinge piece, the protruding rotating member is located on the outer side of the corresponding groove, and at a second end of this hinge piece, the protruding rotating member is located on the inner side of the corresponding groove. Herein, the protruding rotating member being located on the outer side of the corresponding groove means that the protruding rotating member is further away from the center of the hinge than the corresponding groove; similarly, the protruding rotating member being located on the inner side of the corresponding groove means that the protruding rotating member is closer to the center of the hinge than the corresponding groove. Therefore, the term “outer side” refers to a position which is further away from the center of the hinge, and the term “inner side” refers to a position which is closer to the center of the hinge.

Specifically, the inner support member 12 has a hinge structure, and the hinge structure includes two hinge pieces, where the two hinge pieces have the same structure and are connected to form the inner support member. The two hinge pieces are the first hinge piece 121 and the second hinge piece 122, respectively. One end of the first hinge piece 121 is provided with a protruding rotating member 1211*a* and a groove 1212*a*, where the protruding rotating member 1211*a* is located at the outer side of the groove 1212*a*. The other end of the first hinge piece 121 is provided with a protruding rotating member 1211*b* and a groove 1212*b*, where the protruding rotating member 1211*b* is located on the inner side of the groove 1212*b*. One end of the second hinge piece 122 is provided with a protruding rotating member 1221*a* and a groove 1222, where the protruding rotating member 1221*a* is located on the outer side of the groove 1222*a*. The other end of the second hinge piece 122 is provided with a protruding rotating member 1221*b* and a groove 1222*b*, where the protruding rotating member 1221*b* is located on the inner side of the groove 1222*b*.

The groove 1212*a* of the first hinge piece 121 is used to accommodate the protruding rotating member 1221*b* of the second hinge piece 122, the groove 1212*b* of the first hinge piece 121 is used to accommodate the protruding rotating member 1221*a* of the second hinge piece 122, the groove 1222*a* of the second hinge piece 122 is used to accommodate the protruding rotating member 1211*b* of the first hinge piece 121, and the groove 1222*b* of the second hinge piece 122 is used to accommodate the protruding rotating member 1211*a* of the first hinge piece 121. When unfolding the first hinge piece and the second hinge piece, the protruding rotating members at both ends of the first hinge piece are accommodated in the corresponding grooves at both ends of the second hinge piece, and the protruding rotating members at both ends of the second hinge piece are accommodated in the corresponding grooves at both ends of the first hinge piece, making the first hinge piece and the second hinge piece form a planar with an angle of 180° between the first hinge piece and the second hinge piece.

At this time, the protruding rotating member 1211*a*, the protruding rotating member 1211*b*, the protruding rotating member 1221*a*, and the protruding rotating member 1221*b* have the same center axis, and then the first hinge piece and the second hinge piece are fixedly connected to form a circular hinge assembly by rivets, so that the first hinge piece and the second hinge piece can be rotated along the axes of the rivets. FIG. 4*b* shows a schematic diagram of the hinge assembly folded to 90°, and FIG. 4*c* shows a schematic diagram of the hinge assembly folded to 180°.

It is to be noted that when the hinge assembly in a planner state is folded, the first hinge piece overlaps the second hinge piece after being rotated 180° along the rotational axis, and is prevented from further rotation by the edges of both ends of the second hinge piece, so that its rotation angle is limited to 180°; or, the second hinge piece overlaps the first hinge piece after being rotated 180° along the rotational axis, and is prevented from further rotation by the edges of both ends of the first hinge piece, so that its rotation angle is limited to 180°. When the hinge assembly in an overlapped state is unfolded, and the first hinge piece and the second hinge piece form a planner with an angle of 180° between the first hinge piece and the second hinge piece after the first hinge piece is rotated 180° along the rotational axis, the first hinge piece is prevented from further rotation by the edges at both ends of the second hinge piece, so that the rotation angle of the first hinge piece is limited to 180°; or, when the hinge assembly in an overlapped state is unfolded, and the first hinge piece and the second hinge piece form a planner with an angle of 180° between the first hinge piece and the second hinge piece after the second hinge piece is rotated 180° along the rotational axis, the second hinge piece is prevented from further rotation by the edges at both ends of the first hinge piece, so that the rotation angle of the second hinge piece is limited to 180°.

In an embodiment of the present disclosure, the first support member and the second support member are symmetrically arranged along the axis.

Specifically, the first support member and the second support member are symmetrical along the axis, and both of which have the same structure and are interchangeable, further saving intermediate costs.

In another embodiment of the present disclosure, the first support member and the second support member are asymmetrical along the axis.

Specifically, the first support member and the second support member are asymmetric along the axis, and both of which have different structures. As long as the first support member and the second support member can be folded along the axis, no restriction is made on the structure and shape of the first support member and the second support member.

In an embodiment of the present disclosure, the first support member is a first semi-circular member, and the second support member is a second semi-circular member. The first semi-circular member and the second semi-circular member can be foldably connected by the joint member to form a circular outer support frame.

Specifically, in this embodiment, the foldable support frame 1 is in a circular shape, and in another embodiment, the foldable support frame 1 may also be designed in other shapes, such as oval, square, rectangular, polygonal, etc.

As shown in FIGS. 3*a*-3*c*, the foldable support frame 1 is in a circular shape, and includes the first support member 11 and the second support member 12, where the first support member and the second support member have the same structure and are both semi-circular members. The first support member is the first semi-circular member, the second support member is the second semi-circular circular member, and the first semi-circular member and the second semi-circular member are connected by the first joint member 113*a* and the second joint member 113*b* to form the circular outer support frame.

Figure 5A:
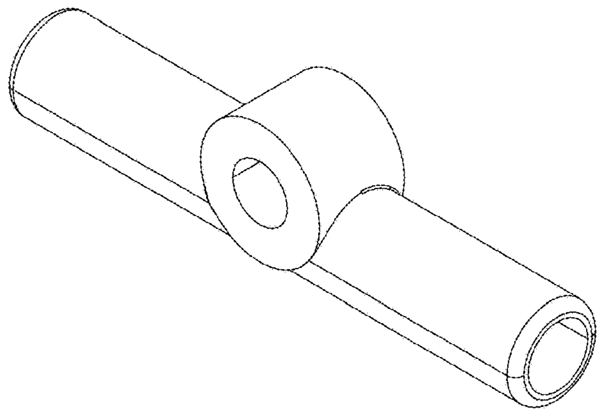
FIGS. 5*a*-5*c* show schematic structural diagrams of a joint member according to an embodiment of the present disclosure.
Figure 5B:
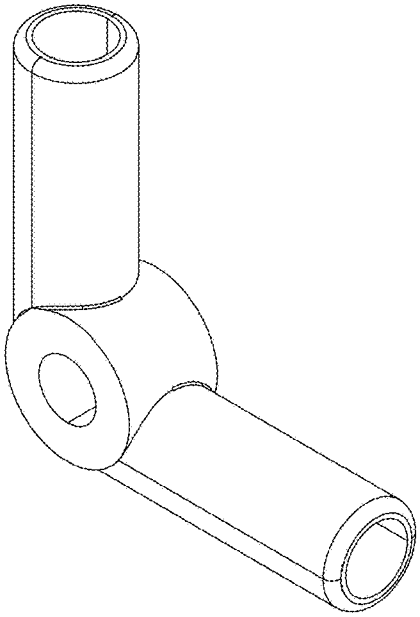
Figure 5C:
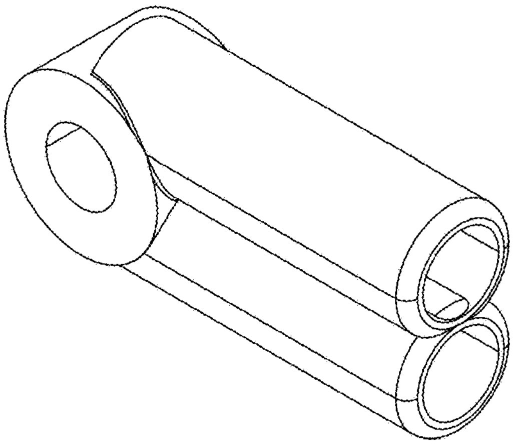

Specifically, the first joint member 113*a* and the second joint member 113*b* have the same structure. FIGS. 5*a*-5*c* show schematic structural diagrams of the joint member. The joint member can be folded, for example, FIG. 5*a* shows a diagram of the joint member in the unfolded state, FIG. 5*b* shows a diagram of the joint member with one end rotating 90°, and FIG. 5*c* shows a diagram of the joint member with one end rotating 180°.

Specifically, the first support member 111 and the second support member 112 are connected by the first joint member 113*a* and the second joint member 113*b*. Due to the first support member 111 and the second support member 112 have the same structure, the first support member 111 can be folded with the help of the first joint member 113*a* and the second joint member 113*b*, and the first support member 111 overlaps the second support member 112 after being rotated 180°. Or, the second support member 112 can be folded with the help of the first joint member 113*a* and the second joint member 113*b*, and the second support member 112 overlaps the first support member 111 after being rotated 180°. Or, the first support member 111 and the second support member 112 are simultaneously folded with the help of the first joint member 113*a* and the second joint member 113*b*, and the first support member 111 and the second support member 112 overlap after they are both rotated 90°.

It is to be noted that the rotational axis of the first joint member 113*a* and the second joint member 113*b* are located on the same axis line with the rotational axis of the hinge structure, so as to form two symmetrical support frame structures when the foldable support frame 1 is folded along the rotational axis of the hinge structure (as shown in FIG. 3*c*).

Specifically, the number of the foldable support frame is no less than 1, which can be set according to the actual needs, and is not limited herein.

In an embodiment of the present disclosure, the inner support member is fixedly connected to the first support member and the second support member by at least two connecting members, respectively.

Specifically, as shown in FIGS. 3*a*-3*c*, the inner support member 12 is fixedly connected to the first support member 111 via a first connecting member 131 and a second connecting member 132, and the inner support member 12 is fixedly connected to the second support member 112 via a third connecting member 133 and a fourth connecting member 134.

It is to be noted that the more connecting members 13, the stronger the fixed connection between the inner support member 12 and the outer support frame 11. The number of the connecting members 13 may be set according to the actual need, therefore, there is no limitation herein.

In an embodiment of the present disclosure, the first support member and the second support member are both provided with multiple first fixing holes for connecting the connecting members.

Specifically, the number of the first fixing holes 114 on the first support member and the second support member is equal to the number of the corresponding connecting members. For example, as shown in FIGS. 3*a*-3*c*, the inner support member 12 is fixedly connected to the first support member 111 via the first connecting member 131 and the second connecting member 132, and the inner support member 12 is fixedly connected to the second support member 112 via the third connecting member 133 and the fourth connecting member 134, so that two first fixing holes 114, i.e., the first fixing hole 1141 and the first fixing hole 1142, are provided on the first support member 111, and two first fixing holes 114, i.e., the first fixing hole 1143 and the first fixing hole 1144, are provided on the second support member.

In an embodiment of the present disclosure, the inner support member is provided with multiple second fixing holes for connecting the connecting members.

Specifically, the number of second fixing holes on the inner support member is equal to the number of the corresponding connecting members.

Figure 4A:
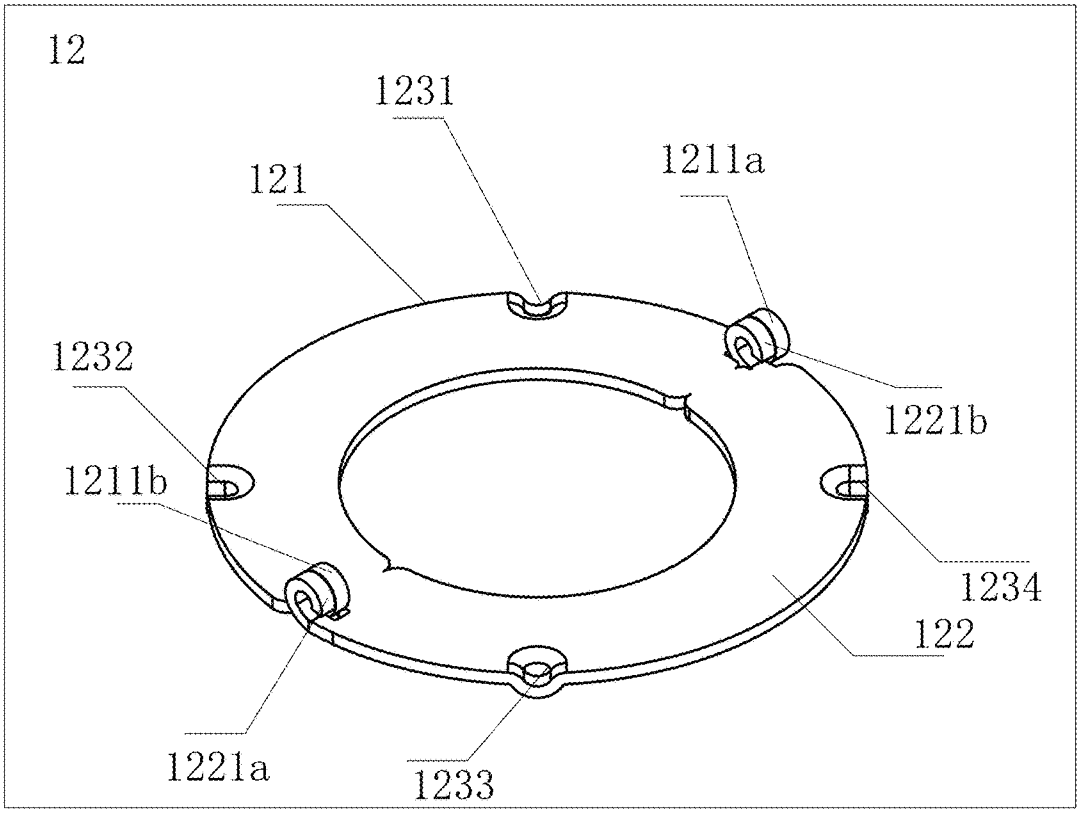
Figure 4B:
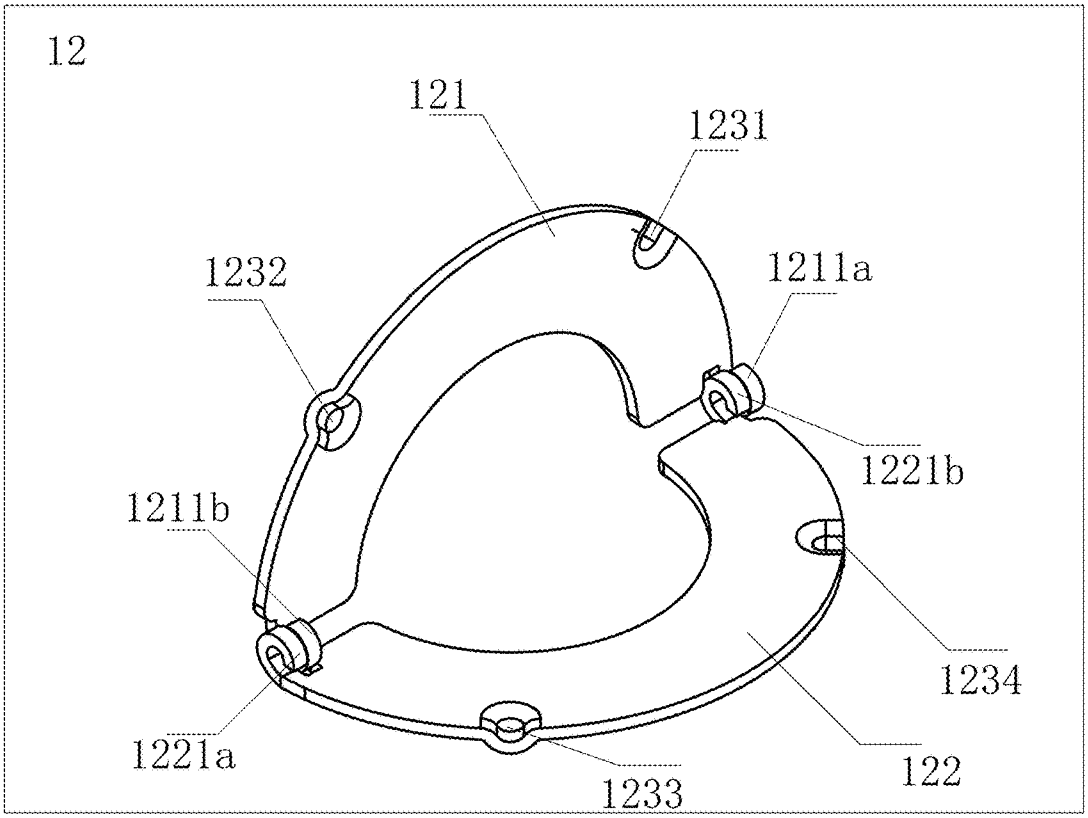
Figure 4C:
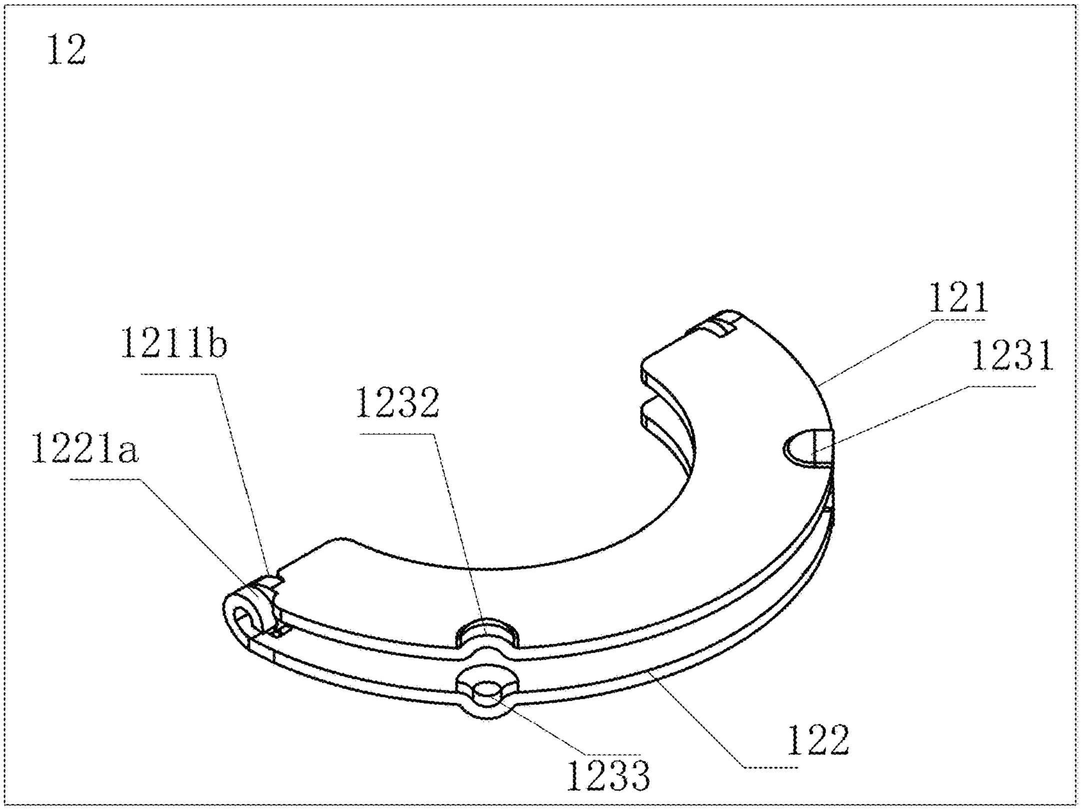
Figure 4E:
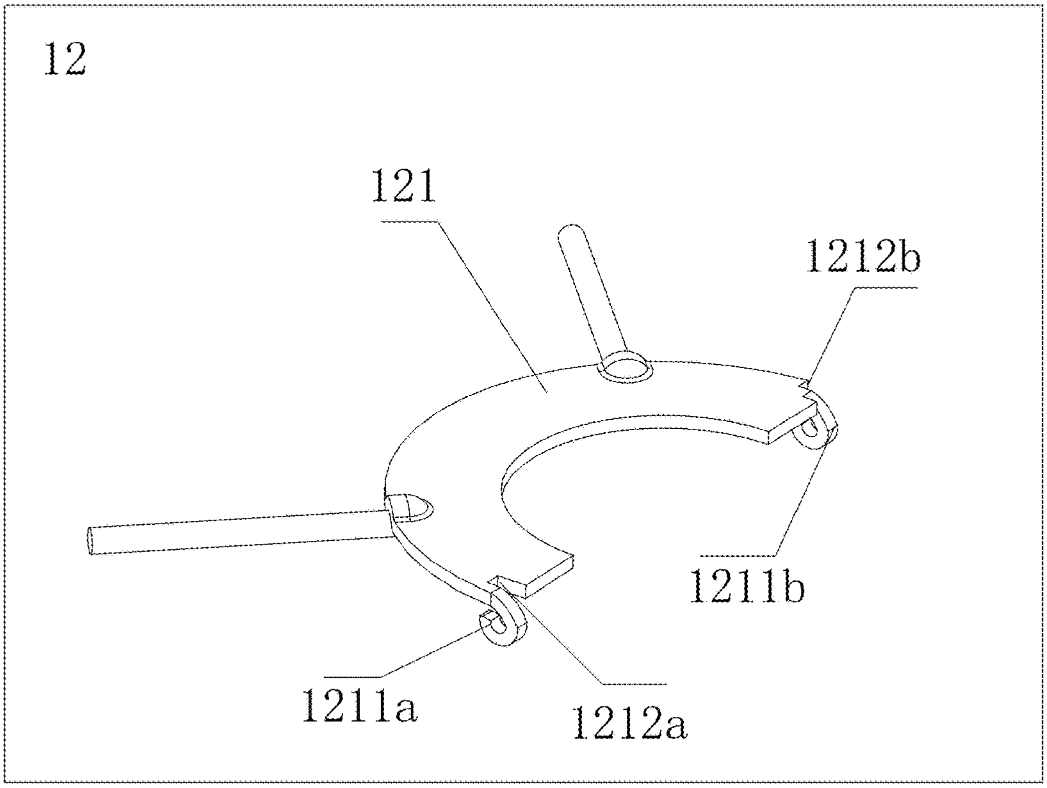
Figure 4F:
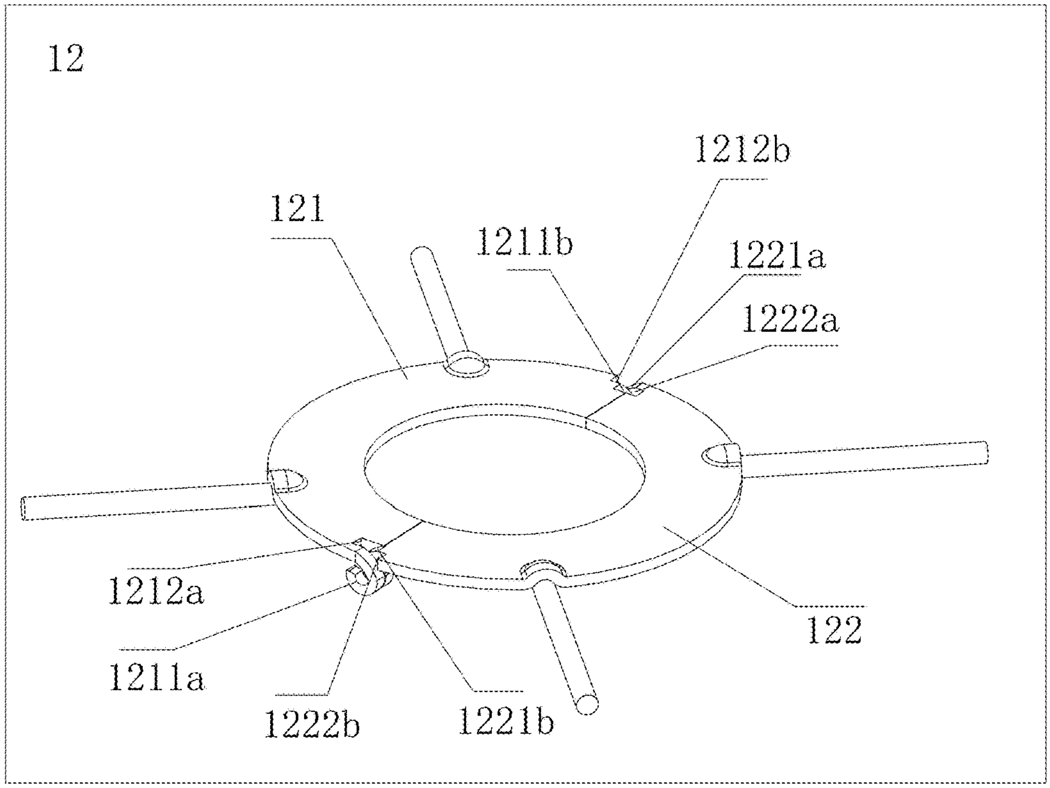

As shown in FIGS. 4*a*-4*c*, the inner support member 12 is provided with four second fixing holes 123, i.e., the second fixing hole 1231, the second fixing hole 1232, the second fixing hole 1233, and the second fixing hole 1234, each of which is connected to the corresponding connecting member.

In an embodiment of the present disclosure, the first support member and the corresponding connecting members form an integral structure, and the second support member and the corresponding connecting members form an integral structure.

Specifically, when the first support member and the second support member are integrally structured with the corresponding connecting members, respectively, there is no need for installation, which saves time and cost. In another embodiment, the first support member and the second support member are detachably connected to the corresponding connecting members, respectively, that is, the first support member, the second support member, and the corresponding connecting members are disassembled and placed separately when not in use, and assembled when in use, which facilitates transportation. In addition, these members are easily assembled.

In an embodiment of the present disclosure, the foldable lampshade further includes a foldable base frame, which is detachably connected to the cloth covering. The foldable base frame includes a support frame, where the support frame includes a third support member, a fourth support member, and multiple joint members, and the third support member and the fourth support member are foldably connected via the joint members.

Figure 6A:
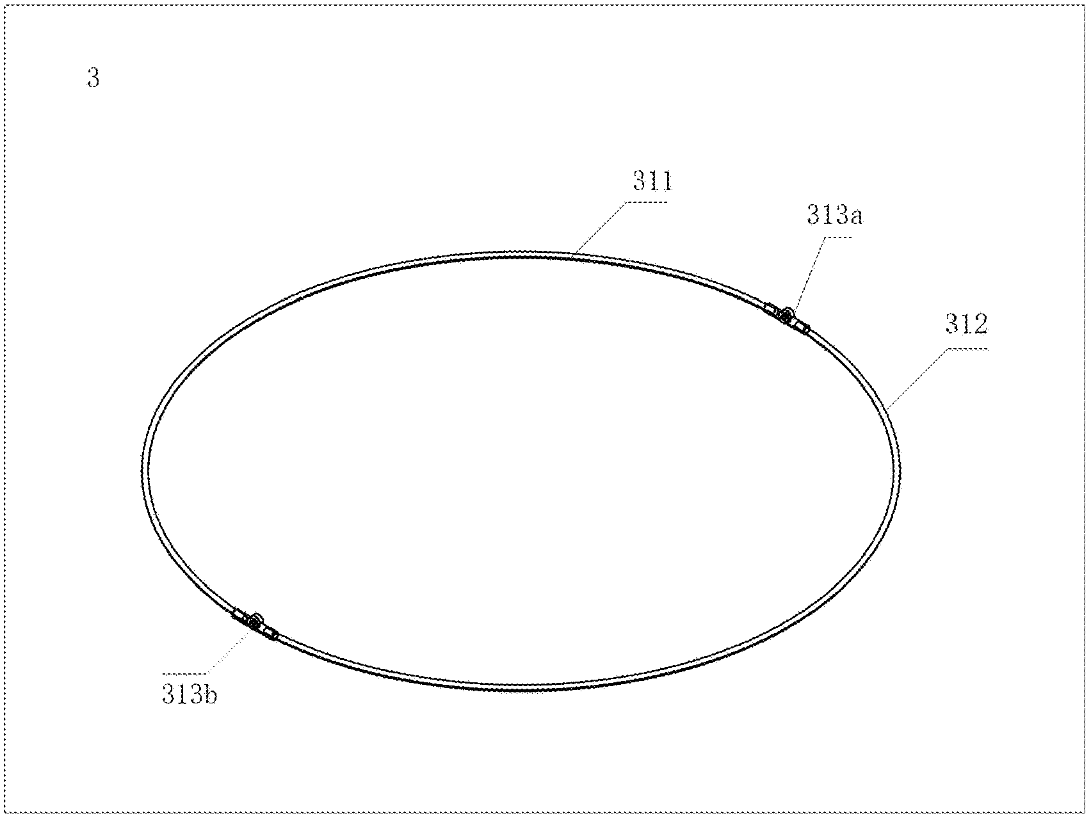
FIGS. 6*a*-6*c* show schematic structural diagrams of a foldable base frame according to an embodiment of the present disclosure.
Figure 6B:
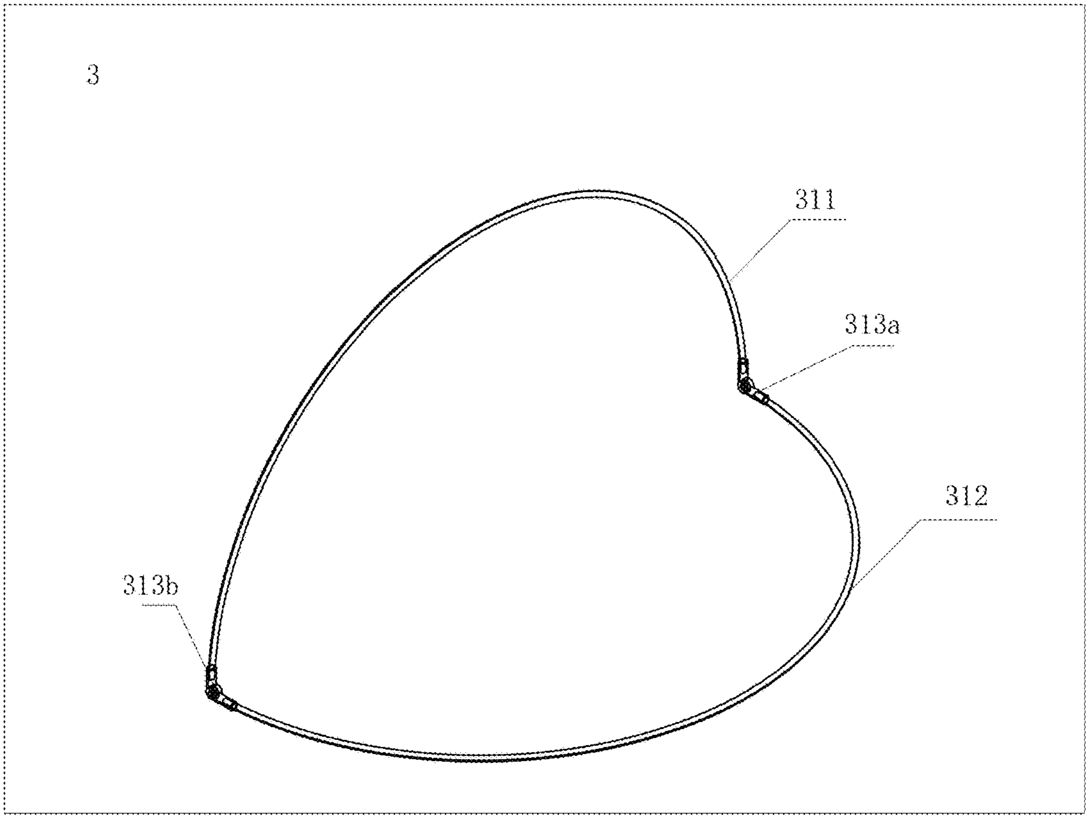
Figure 6C:
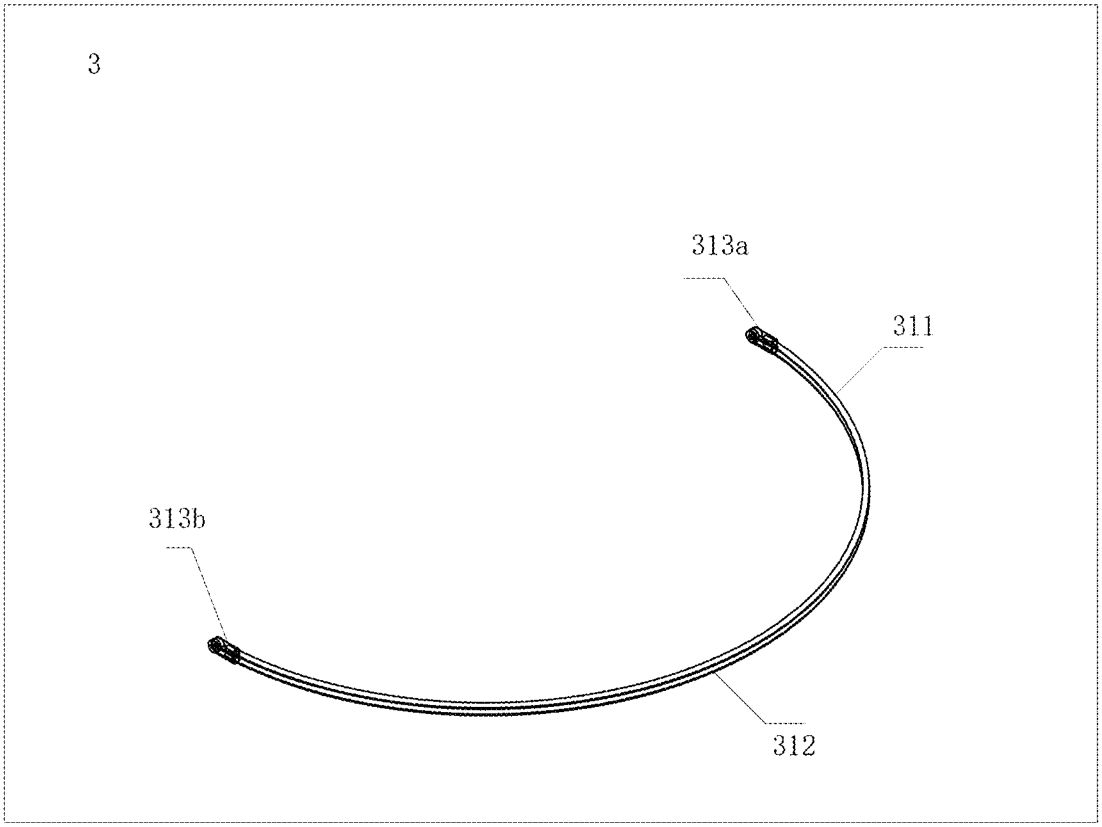

As shown in FIGS. 6*a*-6*c*, the foldable lampshade further includes the foldable base frame 3, the foldable base frame 3 is detachably connected to the cloth covering 2, and the foldable base frame 3 is connected to the foldable support frame 1 via the cloth covering.

It should be noted that when the foldable base frame 3 is detachably connected to the cloth covering 2, assembly is required when they are used, and when the foldable base frame 3 is fixedly connected to the cloth covering 2, they can be used directly, thereby saving time for assembly.

The foldable base frame 3 includes the support frame 31, and the support frame includes the third support member 311, the fourth support member 312, and the joint members 313. The joint members 313 include a third joint member 313*a* and a fourth joint member 313*b*, and two ends of the third support member 311 are foldably connected to two ends of the fourth support member 312 via the third joint member 313*a* and the fourth joint member 313*b*, respectively. FIG. 6*b* shows a schematic diagram of the foldable base frame folded to 90°, and FIG. 6*c* shows a schematic diagram of the foldable base frame folded to 180°.

Specifically, the third joint member 313*a* and the fourth joint member 313*b* have the same structure, and the structures of the third joint member 313*a* and the fourth joint member 313*b* are also the same as that of the first joint member 113*a* and the second joint member 113*b*.

In an embodiment of the present disclosure, the third support member and the fourth support member are symmetrical along the axis of the joint member.

Specifically, the third support member 311 and the fourth support member 312 are connected by the third joint member 313*a* and the fourth joint member 313*b*. The axis of the third joint member 313*a* and the axis of the fourth joint member 313*b* are on the same axis line. The third support member 311 and the fourth support member 312 are symmetrical along the axis of the third joint member 313*a* and the fourth joint member 313*b*, i.e., the third support member 311 and the fourth support member 312 have the same structure, and the third support member 311 can be folded with the help of the third joint member 313*a* and the fourth joint member 313*b*. The third support member 311 overlaps the fourth support member 312 after being rotated 180°. Or, the fourth support member 312 can be folded with the help of the third joint member 313*a* and the fourth joint member 313*b*, and the fourth support member 312 overlaps the third support member 311 after being rotated 180°. Or, the third support member 311 and the fourth support member 312 can be simultaneously folded with the help of the third joint member 313*a* and the fourth joint member 313*b*, and the third support member 311 overlaps the fourth support member 312 when they are rotated 90°, respectively.

In another embodiment of the present disclosure, the third support member and the fourth support member are asymmetrical along the axis of the joint member.

Specifically, the third support member and the fourth support member are asymmetrical along the axis of the joint member, i.e., the third support member and the fourth support member may have different structures. No restriction is made on the structure and shape of the third support member and the fourth support member, as long as the third support member and the fourth support member can be folded along the axis of the joint member.

Specifically, the number of the foldable base frames is no less than 1, which can be set according to the actual needs, and no specific restriction is made herein.

In an embodiment of the present disclosure, the foldable support frame is made of iron-based material.

In an embodiment of the present disclosure, the foldable base frame is made of iron-based material.

Specifically, the foldable support frame and the foldable base frame may also be made of other hard materials, such as alloys, nanomaterial, and the like.

In an embodiment of the present disclosure, the shape of the foldable support frame is selected from a group consisting of circular, rectangular, elliptical, fanshaped, and polygonal.

In an embodiment of the present disclosure, the shape of the foldable base frame is selected from a group consisting of circular, rectangular, elliptical, fanshaped, and polygonal.

Figure 7:
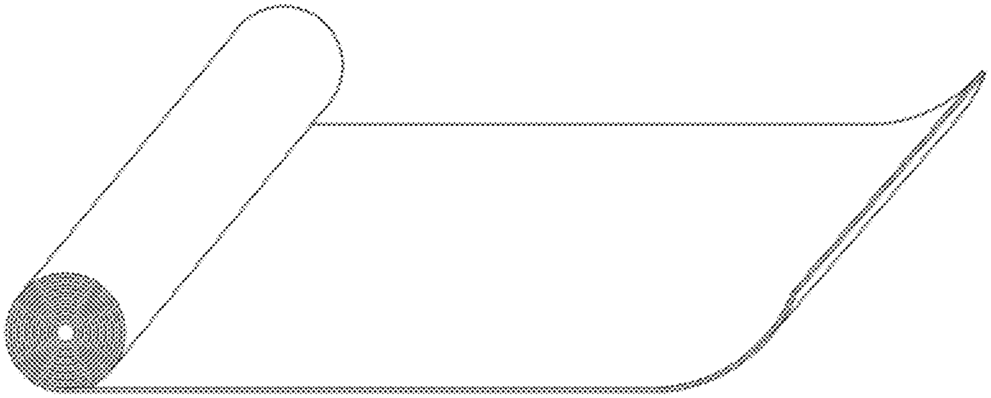
FIG. 7 shows a schematic diagram of the unfolding of a cloth covering according to an embodiment of the present disclosure.

Specifically, for the setting of the cloth covering, the cloth covering can be detachably connected to the foldable support frame and/or the foldable base frame, so that different cloth coverings can be freely used to obtain lampshades with different effects. The cloth covering can also be fixedly connected to the foldable support frame and/or the foldable base frame, so that installation is not required, which saves time for assembly. FIG. 7 shows a schematic diagram of the unfolding of the cloth covering 2.

The working principle of the present disclosure is as follows: the foldable lampshade of the present disclosure has a simple structure and is easy to use, the foldable support frame, the foldable base frame, and the cloth covering can be installed according to FIG. 2 when needed (the foldable lampshade after installation is shown as FIG. 1). The assembled hinge structure is then flattened by a press ring of the lamp holder, i.e., the first hinge piece and the second hinge piece form a planar with an angle of 180°. At the same time, the fabric ensures that the foldable support frame is flat, i.e., the first support member 111 and the second support member 112 are in the same plane. The cloth covering can be detachably connected to the foldable support frame and/or the foldable base frame, therefore, different cloth coverings can be used to obtain lampshades with different effects. The cloth covering can also be fixedly connected to the foldable support frame and/or the foldable base frame, therefore, no installation is required.

The foldable lampshade in the present disclosure has a simple structure, and because of the foldable support frame, it is easy to disassemble and install the foldable lampshade, which does not require additional installation tools. The foldable support frame in the present disclosure can be folded into two identical support members by the setting of the hinge structure and the joint members, and it can be applied to different lamps. In addition, it is easy to pack and transport the foldable lampshade of the present disclosure, which effectively saves the intermediate cost.

The descriptions of the processes or the structures corresponding to each of the above accompanying drawings have their emphasis, and the parts that are not described in detail in a certain process or structure can be referred to as the relevant descriptions of other processes or structures.

The above embodiments are only exemplary to illustrate the principles and efficacy of the present disclosure, and are not intended to limit the present disclosure. Any person familiar with the art may modify or change the above embodiments without violating the spirit and scope of the present disclosure. Therefore, all equivalent modifications or changes accomplished by persons having ordinary knowledge in the technical field without departing from the spirit and technical ideas disclosed in the present disclosure shall still be covered by the claims of the present disclosure.

The invention claimed is:

1. A foldable lampshade, comprising: a foldable support frame and a cloth covering;
- wherein the cloth covering is detachably connected to the foldable support frame;
- wherein the foldable support frame comprises an outer support frame, an inner support member, and a plurality of connecting members connecting the outer support frame and the inner support member;
  - wherein the outer support frame comprises a first support member, a second support member, and a plurality of first joint members, and the first support member and the second support member are foldably connected via the plurality of first joint members; and
  - the inner support member has a hinge structure, and a rotational axis of the plurality of first joint members and a rotational axis of the hinge structure are located on a same axis line.

2. The foldable lampshade according to claim 1, further comprising: a foldable base frame, wherein the foldable base frame is detachably connected to the cloth covering; wherein the foldable base frame comprises a support frame, and the support frame comprises a third support member, a fourth support member, and a plurality of second joint members; wherein the third support member and the fourth support member are foldably connected via the plurality of second joint members.

3. The foldable lampshade according to claim 1, wherein the hinge structure comprises two hinge pieces that match with each other; each end of each hinge piece is provided with a protruding rotating member and a groove; each hinge piece has a first end with one protruding rotating member being located on an outer side of one groove, and a second end with one protruding rotating member being located on an inner side of one groove.

4. The foldable lampshade according to claim 1, wherein the first support member is symmetrical with the second support member along the axis line.

5. The foldable lampshade according to claim 1, wherein the first support member is asymmetrical with the second support member along the axis line.

6. The foldable lampshade according to claim 1, wherein the first support member is a first semi-circular member, and the second support member is a second semi-circular member; wherein the first semi-circular member and the second semi-circular member are foldably connected by the plurality of first joint members to form a circular outer support frame.

7. The foldable lampshade according to claim 1, wherein the inner support member is fixedly connected to the first support member and the second support member through at least two connecting members, respectively.

8. The foldable lampshade according to claim 1, wherein the first support member and the second support member are provided with one or more first fixing holes for connecting the plurality of connecting members, respectively.

9. The foldable lampshade according to claim 1, wherein the inner support member is provided with a plurality of second fixing holes for connecting the plurality of connecting members.

10. The foldable lampshade according to claim 1, wherein the first support member and the corresponding connecting member are integrated into one-piece, and the second support member and the corresponding connecting member are integrated into one-piece.

11. The foldable lampshade according to claim 2, wherein the third support member is symmetrical with the fourth support member along a rotational axis of the plurality of second joint members.

12. The foldable lampshade according to claim 2, wherein the third support member is asymmetrical with the fourth support member along a rotational axis of the plurality of second joint members.

13. The foldable lampshade according to claim 1, wherein a shape of the foldable support frame is selected from a group consisting of circular, rectangular, elliptical, fan-shaped, and polygonal.

* * * * *